Jan. 4, 1966  R. W. VREELAND ETAL  3,226,911
FILM PACKAGING ARRANGEMENT
Filed Sept. 28, 1962
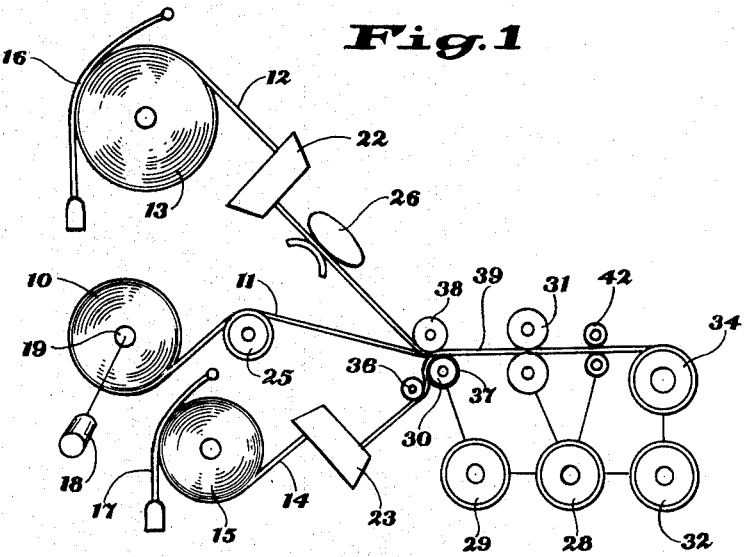
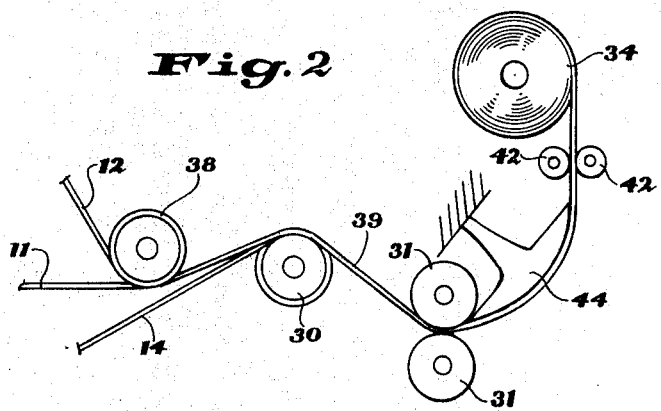
Robert W. Vreeland
Horace G. Warren
INVENTORS
BY R. Frank Smith
David P. Ogden
ATTORNEYS

3,226,911
FILM PACKAGING ARRANGEMENT
Robert W. Vreeland and Horace G. Warren, Rochester, N.Y., assignors to Eastman Kodak Company, Rochester, N.Y., a corporation of New Jersey
Filed Sept. 28, 1962, Ser. No. 227,017
13 Claims. (Cl. 53—28)

This invention relates to a packaging arrangement and, more particularly, to a device and method for packaging pressure-sensitive strips of X-ray film material.

With the advent of X-ray testing of metal fatigue and hidden material failures, the X-ray film market has changed substantially. Although it has been known for some time that film wrapper creases cause erroneous straight-line images to occur in X-ray film, such spurious information is easily recognizable when the subject of the X-ray is a part of the human body, and the like, where the straight-line images do not usually occur. Moreover, film sheets having a maximum length of about twenty inches may be packaged and otherwise handled without bending the film or its package. As may be expected, X-ray examination of a large equipment requires the use of X-ray films of substantially greater dimensions than those used in medical work. Also, when testing metals such as an airplane wing for fatigue damage, straight-line images are likely to be indicative of serious weaknesses within the aircraft.

One practical solution to the providing of larger X-ray films is by marketing of strip films a hundred feet or more in length. With such film strips and the knowledge that these strips must spread over large areas during use, it is most practicable to seal the film strip in a long opaque wrapper. Obviously, such a package may not be practically transported in a flat condition because of the pressure sensitiveness of the X-ray film. Moreover, when the film is coiled on a reel, we have found that the inner wrapper member tends to be creased because of its longitudinal compression during the winding operation. Such creases result in erroneous pressure images on the film.

Therefore, a primary object of the present invention is to provide an improved packaging arrangement for long strips of X-ray film, which arrangement will allow complete packaging of such strips without developing pressure images on the film.

One embodiment of the present invention comprises a feed mechanism, which will present a pair of superposed continuous wrapper strips which are sealable as opaque envelope layers by an edge-sealer mechanism. A strip of X-ray film positioned between wrapper strips is sealed within the flat tube developed by the edge sealer. The flat tube is drawn through the edge sealer and secured to a take-up reel so that it may be wound thereon, whereby the edge sealer continuously seals the edges of the superposed strips, and the finished product is stored on the reel. In accordance with one arrangement of the present invention, the reel is rotated so that the lower surface web of the package is innermost and, therefore, the one likely to develop compression creases. However, compression creases are prevented by applying a differential tension of the order of five pounds per inch width of the lower wrapper strip during the edge-sealing operation.

The subject matter which we regard as our invention is particularly pointed out and distinctly claimed in the concluding portion of this specification. This invention, however, as to its organization and method of operation, together with further objects and advantages thereof, will best be understood by reference to the following detailed description taken in connection with the accompanying drawing, in which FIG. 1 is a schematic side plan view of the film packaging arrangement of our invention, and
FIG. 2 is a detailed view, partially in section, of another embodiment of the present invention.

Referring now to the drawing, wherein like numbers refer to similar parts, in FIG. 1 we have shown an X-ray strip film supply reel 10, containing a film strip 11 having a length of the order of 1,000 feet or more and a width of the order of 5 or 12 inches. Also provided are a top surface wrapper strip 12, which may be stored for use on and supplied from a 1,500-foot reel 13, and a lower surface wrapper strip 14, which may be stored on a similar reel 15. The wrapper strips are preferably of a yellow kraft paper having heat-sealable mating surfaces. As is well known, such paper is relatively inelastic and nonresilient. The reels 13 and 15 are engaged by weighted canvas straps 16 and 17, which help to develop enough tension in the wrapper strips to prevent wrinkling because of the inelasticity of the paper or backlash problems during the sealing operation or at the time of shutdown of the present invention. The reel 10 is provided with somewhat similar means of preventing undesired rotation thereof. However, we prefer that it be in the different form such as a magnetic brake 18 on a rotatable shaft 19 thereof so that it is not necessary to place any pressure member directly on the film strip 11.

All of these strips, being supplied by the reels 10, 13, and 15, must be aligned before the wrapper strips are integrally sealed, preferably by conventional means such as the commercially available aligners 22 and 23 or a flanged guide roller 25. For identification purposes, there is provided means such as a printer 26 for encoding, from time to time, the upper surface wrapper strip 12. A similar printer (not shown) may be provided to encode the lower surface wrapper strip 14.

The speed at which the machine operates is controlled by a synchronous motor 28 drivingly coupled through a positive drive clutch 29 to a high surface-friction drive roller 30 and a pair of heated edge sealers 31 and coupled through an adjustable torque magnetic slipping drive clutch 32 to a take-up reel 34. In order that the drive roller 30 will control the speed at which the system operates, an idler roll 36 is arranged to cause one of the wrapper strips such as the lower wrapper strip 14 to engage a substantial portion of a rubber surface 37 of the drive roller 30. An idler roll 38 guides the upper wrapper 12 and the film strip 11 over the top surface of the drive roller 30 to provide a composite web 39 which moves continuously toward the edge sealers 31.

In order that the finished X-ray package of up to 200 feet or more may be stored on a reasonably small reel, the slipping clutch 32 develops a tangential force at the periphery of the take-up reel 34. In the event that our present invention is being used to package 12-inch strips, a differential tension of 75 pounds is sufficient to prevent creases in the lower wrapper strip 14. It is obvious that the tension in the upper wrapper strip 12 is much less, being controlled primarily by the friction of the feed arrangement and the weighted canvas strap 16. This disparity in tension slightly stretches the lower wrapper or at least causes it to be straighter than the upper wrapper during the edge-sealing operation so that, when the film package is completely wrapped on the take-up reel 34, the tension in the inner and in the outer wrapper is substantially equal. Since the inner wrapper strip is, in fact, appreciably shorter than the outer wrapper strip with a difference of several inches in a two hundred-foot film strip coil and since the paper is substantially incompressible longitudinally, we have found that without use of our invention the inner wrapper tends to have therein lateral creases from time to time which cause corresponding lateral images when the film is developed.

When packaging a 5-inch wide film strip 11, a tension of about 30 pounds is required to deevlop a nonwrinkled film package coil on a reel having a diameter varying between about 12 and 15 inches throughout the region of the film package. As will be apparent from analysis of the present invention, we are actually creating a differential velocity of the order of 1:300. In other words, the innermost wrapper travels only about 299 inches to the outer wrapper's 300-inch travel. However, the differential ratio will vary somewhat for different size rolls and for different thickness film packages.

In order to develop a wrinkle-free reeled film strip package, the idler 36 is positioned to provide at least 90° contact of the lower wrapper strip 14 about the rubber surface 37 of the drive roller 30. Such contact assures that the speed of the drive roller 30 will control the speed of the composite web 39 supplied to the edge sealers 31.

It is apparent that if the package were filled with air, it would be thicker, whereby the differential length of the inner and outer wrapper strips would be larger and the tendency of the creasing of the inner wrapper on the reel 34 would be increased. Therefore, we prefer to purge air from the package prior to its reaching the reel 34. This is most easily accomplished by a pair of wringer rollers 42.

It should be noted that, if the take-up reel 34 were driven in the opposite direction, the drive roller 30 would be placed above the composite web 39, whereby the top surface wrapper strip 12 would be partially wrappered therearound and tensioned in the same manner as discussed above in connection with the lower strip 14. In either case the pretensioning results in the inner wrapper strip being slightly shorter because of its traveling at a slightly lower velocity through the edge-sealer mechanism. Obviously, the tensioning arrangement is reversible. That is, we can exchange the clutches 29 and 32, allowing the roller 30 to slip through an adjustable torque slipping clutch (at 29) and pulling the composite web 39 by a positive drive on either the wringer rollers 42 or the take-up reel 34. When the clutch 29 is a drag clutch, it should be either fluid or magnetic, and by coupling it to supply a major portion of its energy to the motor 28, minimum heating obtains.

In FIG. 2 we have shown another arrangement which will provide a similar differential travel or stretching of one of the surface wrapper strips of the finished X-ray film package. In this embodiment, the roller 30 is used only as a guide roller and helps to present the composite web 39 to the edge sealers 31 at an angle so that the surface wrapper strips 12 and 14 are bent during the entire time edge sealing is accomplished. Similarly, the wringer rollers 42 are skewed relative to the common tangential plane of the edge sealers 31 to further assure an effective pretensioning or prebending of the surface wrapper strips during the edge-sealing operation.

Because of the fact that we are heat sealing the edges of the composite web 39, we prefer to maintain a desired curvature thereof during the initial cooling of the hot edge seal. Otherwise the differential travel of the wrapper strips is sometimes lost by slippage of the still tacky edge-seal joint. This is most easily accomplished by an arcuate take-off guide 44, having a peripheral curvature similar to the tangential curvature of the take-up reel 34.

As shown in FIG. 2, the upper surface wrapper strip 12 is effectively shortened to allow inner wrapping thereof, while in the embodiment discussed in connection with FIG. 1, the lower wrapper strip 14 was so shortened. The take-up reel 34 itself or the wringer rollers 42 are positively driven to pull the composite web 39 from the region of the edge sealers 31. However, this pulling may be accomplished at a much lower torque, as it is no longer necessary to stress either of the surface wrapper strips an amount approaching five pounds per inch width. Thus, the rollers 30 and 38 become idlers with the tension on the composite web 39, as developed by the weighted straps 16 and 17, being sufficient to assure the composite web 39 approaching the edge sealer 31 from the upward direction.

One function of the wringer rollers 42 (FIG. 2) is to assure that the composite web 39 leaves the edge sealer 31 in an upward direction over the outer surface of the guide 44, whereby the seal is bent substantially during the complete sealing operation. The wringer rollers 42 also purge air from the film package.

While we have shown and described particular embodiments of the present invention, other modifications may occur to those skilled in this art. We intended, therefore, to have the appended claims cover all modifications which fall within the true spirit and scope of our invention.

We claim:

1. A strip film packaging arrangement having an inner wrapper strip subject to compressional creasing considerations because of coiling thereof comprising:
    means for supplying a strip of pressure-sensitive film between a pair of superposed opaque wrapper strips;
    means for sealing together the edges of said pair directly without sealing either of said pair to the film;
    means for driving said pair through the packaging arrangement so that one of said pair travels slightly slower than the other during the sealing operation; and
    means for coiling the film package resulting from said edge-sealer means with said one strip being innermost throughout the coiling operation.

2. A strip film packaging arrangement comprising:
    means for supplying a strip of pressure-sensitive film between a pair of superposed opaque wrapper strips;
    means for sealing together the edges of said pair directly without securing the film to either of said pair;
    means for pulling said pair through said edge-sealer means so that one of said pair travels therethrough slightly faster than the other; and
    means for coiling the film package resulting from said edge-sealer means with said one strip being outermost throughout the coiling operation.

3. A film packaging arrangement for packaging pressure-sensitive film strips of a length of the order of one hundred feet or more in opaque coilable composite strips comprising:
    means for supplying a strip of pressure-sensitive film between a pair of superposed wrapper strips;
    means for sealing together only the edges of the wrapper strips to thereby enclose the film in an elongated envelope;
    means for applying a differential tension of the order of five pounds per inch width to one of the pair during the complete edge-sealing operation; and
    means for coiling the film package resulting from said edge-sealing means with said one strip being innermost throughout the coiling operation.

4. A film packaging arrangement for packaging pressure-sensitive film strips of a length of the order of one hundred feet or more in an opaque coilable composite strip and comprising:

means for supplying a strip of pressure-sensitive film between a pair of superposed nonresilient wrapper strips;

means for sealing together only the edges of the wrapper strips to thereby envelope the film strip in an enlongated package;

roller means for purging air from the composite strip;

take-up means for coiling the air-purged film strip package with one wrapper strip being innermost throughout the coiling operation;

slipping clutch means for driving said take-up means to develop a pulling force of the order of five pounds per inch width of the composite strip; and speed-control means positively engaging said one wrapper strip, whereby said one wrapper strip is differentially tensioned and reacts to substantially all of said pulling force.

5. A film packaging arrangement for packaging pressure-sensitive film strips of a length of the order of one hundred feet or more in an opaque coilable composite strip comprising:

means for supplying a strip of pressure-sensitive film between a pair of superposed wrapper strips;

means for sealing together only the edges of the wrapper strips;

roller means for purging air from the composite strip;

take-up means for coiling the air-purged film strip package with one wrapper strip being innermost throughout the coiling operation;

slipping clutch means coupled to develop a pulling force of the order of five pounds per inch width in said one wrapper strip throughout the region of said edge-sealing means; and speed-control means positively engaging said one wrapper strip, whereby said one wrapper strip is differentially tensioned.

6. A film packaging arrangement for packaging pressure-sensitive film strips of a length of the order of one hundred feet or more in an opaque coilable composite strip enveloping a pressure-sensitive film comprising:

means for sealing together the edges of a pair of superposed nonresilient wrapper strips with the film therein;

take-up means for coiling the film package with one of the pair of wrapper strips being innermost throughout the coiling operation and having a predeterminable average radius of curvature; and an arcuate take-off guide receptive of the film package immediately downstream of said edge-sealing means with said one wrapper strip being innermost thereover and with said guide having a radius of curvature substantially equal to said average radius.

7. A film packaging arrangement for packaging pressure-sensitive film strips of a length of the order of one hundred feet or more in an opaque coilable composite strip comprising:

means for supplying a strip of pressure-sensitive film between a pair of superposed wrapper strips;

means for sealing together the edges of the wrapper strips;

take-up means for coiling the package resulting from said edge-sealing means with one wrapper strip being innermost throughout the coiling operation and having a predeterminable average radius of curvature; and means for bending the film package throughout the edge-sealing region with said one wrapper strip being innermost so that said one wrapper strip is appreciably shorter than the other wrapper strip.

8. A film packaging arrangement for packaging pressure-sensitive film strips of a length of the order of one hundred feet or more in an opaque coilable composite strip subject to creasing considerations, comprising the steps of:

supplying a strip of pressure-sensitive film between a pair of superposed opaque wrapper strips;

sealing together the edges of the wrapper strips;

coiling the package resulting from said edge-sealing step with one wrapper strip being innermost throughout the coiling operation and having a predeterminable average radius of curvature; and bending the film package throughout the edge-sealing step with said one wrapper strip being innermost so that said one wrapper strip is appreciably shorter than the other wrapper strip.

9. A film packaging arrangement for packaging pressure-sensitive film strips of a length of the order of one hundred feet or more in an opaque coilable composite strip subject to creasing considerations, comprising the steps of:

supplying a strip of pressure-sensitive film between a pair of superposed opaque nonresilient wrapper strips;

sealing together the edges of the wrapper strips;

coiling the composite strip resulting from said edge-sealing step with one wrapper strip being innermost throughout the coiling operation; and differentially tensioning said one wrapper strip throughout the edge-sealing step so that said one wrapper strip is appreciably shorter than the other wrapper strip.

10. A film packaging arrangement for packaging pressure-sensitive film strips of a length of the order of one hundred feet or more in an opaque coilable composite strip having a pair of superposed opaque nonresilient wrapper strips, one of which is subject to creasing considerations because of its nonresiliency, comprising the steps of:

sealing to each other the mating edges of the wrapper strips;

controlling the velocities of the pair of wrapper strips throughout the edge-sealing step so that one wrapper strip is appreciably shorter than the other wrapper strip; and coiling the composite sealed strip resulting from said edge-sealing step with said one wrapper strip being innermost.

11. A strip film packaging arrangement subject to compressional creasing considerations because of coiling thereof, comprising the steps of:

supplying a strip of pressure-sensitive film between a pair of superposed opaque wrapper strips;

sealing together the edges of said pair;

pulling said pair through the packaging arrangement so that they travel at a differential velocity relative to each other of the order of 299:300 during the sealing operation; and coiling the film package resulting from said edge sealing step with the slower strip of said pair being innermost throughout the coiling operation.

12. A film packaging arrangement for packaging pressure-sensitive film strips of a length of the order of one hundred feet or more in an opaque coilable composite strip subject to creasing considerations, comprising the steps of:

sealing together the edges of a pair of wrapper strips enveloping the film;

coiling the composite strip resulting from said edge-sealing step with one wrapper strip being innermost throughout the coiling operation and having a predeterminable average radius of curvature; and bending the composite strip an amount of the order of said average radius with said one wrapper strip being innermost throughout the edge-sealing step so that said one wrapper strip is appreciably shorter than the other wrapper strip.

13. A film packaging arrangement for packaging pressure-sensitive film strips of a length of the order of one hundred feet or more in an opaque coilable composite strip having a pair of superposed opaque wrapper strips, one of which subject to creasing considerations, comprising the steps of:
  sealing together the edges of the wrapper strips;
  differentially tensioning one of the pair of wrapper strips throughout the edge-sealing step so that said one wrapper strip is appreciably shorter than the other wrapper strip; and
  coiling the composite sealed strip resulting from said edge-sealing step with said one wrapper strip being innermost throughout the coiling operation.

References Cited by the Examiner
UNITED STATES PATENTS

| | | | |
|---|---|---|---|
| 2,180,338 | 11/1939 | Cloud | 53—51 X |
| 2,351,350 | 6/1944 | Mallory | 156—16 X |
| 2,375,451 | 5/1945 | Waters | 53—51 X |
| 2,546,059 | 3/1951 | Cloud | 53—51 X |
| 2,577,476 | 12/1951 | Nashley | 156—164 X |
| 2,800,946 | 7/1957 | Steffen | 156—495 X |
| 2,803,579 | 8/1957 | Stolle et al. | 156—324 |

FRANK E. BAILEY, *Primary Examiner.*

TRAVIS S. McGEHEE, *Examiner.*